Jan. 9, 1923.
R. P. MOORE.
SAFETY CLUTCH FOR SAW MANDRELS.
FILED DEC. 1, 1920.
1,441,819.
2 SHEETS—SHEET 1.
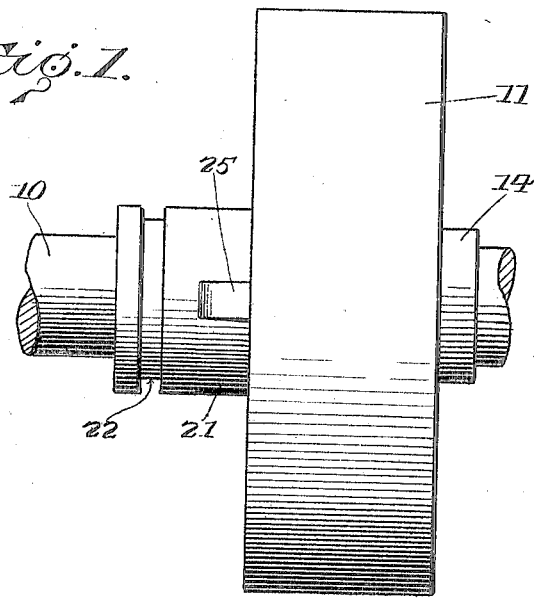
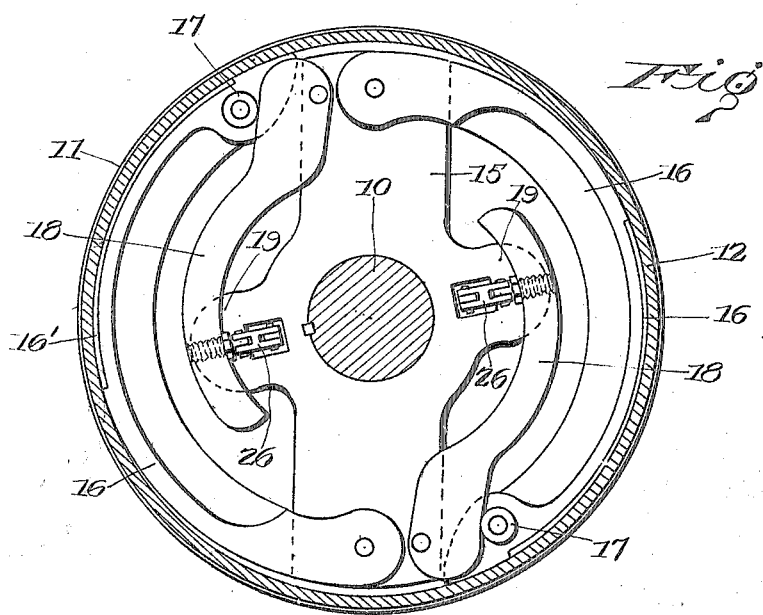
INVENTOR.
Ralph P. Moore.
BY
ATTORNEYS
Witness.
James F. FitzGibbon

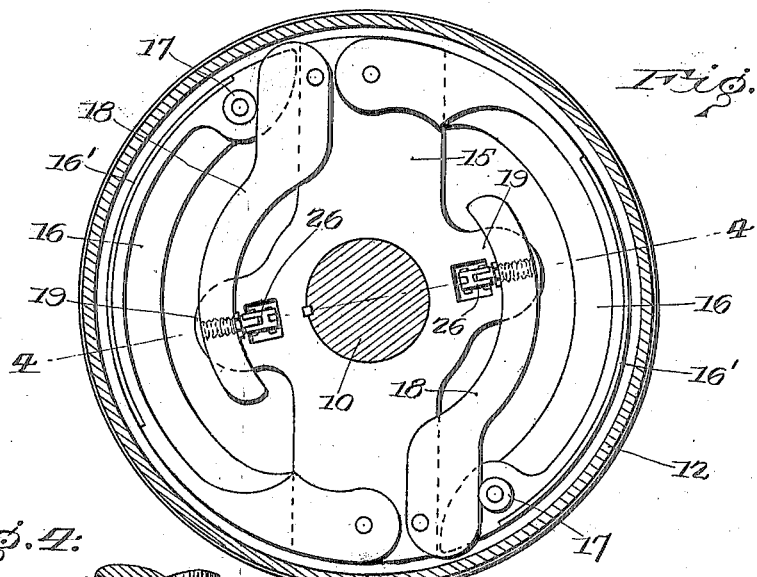

Patented Jan. 9, 1923.

1,441,819

UNITED STATES PATENT OFFICE.

RALPH P. MOORE, OF MORRISVILLE, NORTH CAROLINA.

SAFETY CLUTCH FOR SAW MANDRELS.

Application filed December 1, 1920. Serial No. 427,528.

*To all whom it may concern:*

Be it known that I, RALPH P. MOORE, a citizen of the United States, residing at Morrisville, in the county of Wake, State of North Carolina, have invented certain new and useful Improvements in Safety Clutches for Saw Mandrels; and I do hereby declare the following to be a full, clear, and exact description of the invention, such as will enable others skilled in the art to which it appertains to make and use the same.

This invention has particularly to do with a clutch for use in connection with saw machines for stopping the saw.

It often happens that the sawyer sees a nail or spike in the log and in such an event it is necessary to stop the machine before the saw has reached the nail or spike, and thus prevent injury to the teeth of the saw.

The present invention is a clutch which is so connected with the saw mandrel that the sawyer can immediately disengage the saw from the rotating wheel while the saw remains stationary in the kerf in the log, and the wheel continues to rotate. The device is so constructed that it can be easily and quickly operated by the sawyer upon the simple movement of a lever, which he actuates at the same time that he throws the lever which stops the feed.

Other objects and advantages will be apparent from the folllowing description when taken in connection with the accompanying drawings.

In the drawings:

Figure 1 is a view looking toward the edge face of the belt wheel which contains the novel clutch.

Figure 2 is a side elevation of the belt wheel showing the clutch mechanism in elevation, and in normal or operative position for the rotation of saw and mandrel.

Figure 3 is a similar view to that shown in Figure 2, but with the clutch thrown out to permit the saw to remain stationary in the kerf of the log, and the wheel to continue its rotation.

Figure 4 is a horizontal transverse sectional view through the belt wheel and clutch mechanism, on the line 4—4 of Figure 3, which line passes through the openings in the hub through which the lever actuating links are disposed, the clutch being in engaged position with the flange of the wheel.

Figure 5 is a similar sectional view to that of Figure 4, but with the clutch disengaged from contact with the flange of the wheel.

Referring particularly to the accompanying drawings 10 represents a shaft on which is loosely rotatable the belt wheel or pulley 11, said pulley having the hub 14 and the circumferential flange 12 for engagement thereon of a drive belt, not shown. A hub 14′ on the shaft 10 has the radially and oppositely extending arms 15, and pivotally connected to one face of the outer end of each arm is an end of one curved spring clutch arm or shoe 16, the outer or convex face of which is arranged to frictionally contact with the inner face of the flange of the belt wheel or pulley 11. As will be understood, these curved arms or shoes normally spring inwardly away from the flange 12, and are adapted to be brought into frictional engagement with the flange by a positive means which will be later described. The other or free end of each of the arms 16 is formed with a slightly enlarged portion on one side of which is carried a small roller 17. Also pivotally mounted on the outer end portion of each arm 15 adjacent the pivoted end of the arm 16, is a circumferentially extending curved lever 18. The pivotal end portion of each lever 18 is disposed in parallel relation to the spokes, and one edge face of the curved arm 18 contacts with the before mentioned roller 17 so that when the lever is swung in a direction away from the center of the wheel, this portion of the lever, by its engagement with the roller, will force the curved arm outward into frictional engagement with the inner face of the flange of the wheel 11, whereby the mandrel and wheel will be clutched together.

Formed on the hub 14′, at diametrically opposite points, are the bosses or enlargements 19, and formed through each boss, in a direction longitudinally of the mandrel or shaft 10, is an opening 20. Slidable and rotatable on the shaft or mandrel 10 is a collar 21, having a circumferential groove 22 for the reception of a shifting yoke, not shown. Extending longitudinally from one end of the collar 21, and rigidly connected thereto, are the arms 25 which slidably engage in the openings 20. Pivotally connected to the inner end of each arm 25, within an opening 20, is a link 26. Threaded into each curved arm or lever 18 is a stem 27, which is pivotally connected with a link 26. Thus, as the arms 25 are moved longitudinally in the openings 20 the links will cause the stems to move inwardly and outwardly, so that the levers 18 will be swung on their pivots to engage with and disengage from the rollers 17, and thereby move the clutch arms 16 into and out of frictional contact with the flange of the wheel 11. It will be noted, upon reference to Figure 4, that when the clutch arms 16 are in frictional engagement with the flange of the wheel, the links 26 stand perpendicular to the longitudinal axis of the mandrel, and will remain in such position while the mandrel and wheel rotate, but upon outward movement of the collar and arms 25, the links will be moved into positions oblique to the axis of the shaft or mandrel. This latter position permits the clutch arms 16 to flex inwardly away from the flange of the wheel, and thereby release the wheel from the mandrel, with the result that the saw, which is secured to the shaft 10 will remain stationary in the kerf in the log, while the wheel 11 continues to rotate. The saw is thus stopped at the proper time to avoid contact with a nail or spike, which the sawyer may see in the log just ahead of the saw. The outer faces of the curved arms 16 are provided with asbestos as shown at 16'.

What is claimed is:

The combination with the saw mandrel of a sawing machine, of a flanged wheel mounted on the mandrel, a hub keyed on the shaft and disposed within the flange of the wheel, said hub having radiating arms, curved flexible clutch arms pivotally carried by the radiating arms and having laterally extending rollers on their free ends, levers pivotally mounted on the radiating arms and normally engaged with the said rollers, a collar slidable on the said mandrel and having longitudinally extending arms, the said hub having longitudinal openings receiving the longitudinally extending arms slidably therethrough, stems extending radially with respect to the said wheel and adjustably engaged with the levers, links pivotally connecting the longitudinally extending arms and the said stems, and means for moving the collar.

In testimony whereof, I affix my signature, in the presence of two witnesses.

RALPH P. MOORE.

Witnesses:
T. C. CROMPTON,
S. BOWLING.